United States Patent
Abe et al.

(10) Patent No.: US 7,380,823 B2
(45) Date of Patent: Jun. 3, 2008

(54) KNEE-BAG AND OCCUPANT LEG PROTECTION APPARATUS

(75) Inventors: Kazuhiro Abe, Berlin (DE); Masayoshi Kumagai, Ika-gun (JP); Yoshiki Murakami, Konan (JP)

(73) Assignee: Takata Corporation, Tokyo (JP)

( * ) Notice: Subject to any disclaimer, the term of this patent is extended or adjusted under 35 U.S.C. 154(b) by 330 days.

(21) Appl. No.: 11/063,875

(22) Filed: Feb. 24, 2005

(65) Prior Publication Data

US 2005/0189741 A1 Sep. 1, 2005

(30) Foreign Application Priority Data

Feb. 27, 2004 (JP) .............. 2004-054306

(51) Int. Cl.
  *B60R 21/16* (2006.01)
(52) U.S. Cl. .............. 280/743.2; 280/730.1; 280/751
(58) Field of Classification Search .......... 280/730.1, 280/743.1, 743.2, 751, 752; 296/70, 487
  See application file for complete search history.

(56) References Cited

U.S. PATENT DOCUMENTS

| | | | | |
|---|---|---|---|---|
| 6,217,059 B1 * | 4/2001 | Brown et al. ............ | 280/730.2 |
| 6,536,800 B2 * | 3/2003 | Kumagai et al. ........ | 280/743.1 |
| 6,685,217 B2 * | 2/2004 | Abe ........................ | 280/730.1 |
| 6,916,039 B2 * | 7/2005 | Abe ......................... | 280/729 |
| 6,929,285 B2 * | 8/2005 | Yamada et al. .......... | 280/743.2 |
| 6,945,557 B2 * | 9/2005 | Takimoto et al. ........ | 280/730.1 |
| 7,055,858 B2 * | 6/2006 | Takimoto et al. ........ | 280/743.1 |
| 7,066,487 B2 * | 6/2006 | Sullivan et al. ............. | 280/729 |
| 7,128,337 B2 * | 10/2006 | Kwon ....................... | 280/743.1 |
| 2002/0153717 A1 | 10/2002 | Keshavaraj | |
| 2003/0120409 A1 | 6/2003 | Takimoto et al. | |
| 2005/0082807 A1 * | 4/2005 | Kwon ....................... | 280/743.2 |
| 2005/0098985 A1 * | 5/2005 | Sullivan et al. ............. | 280/729 |

FOREIGN PATENT DOCUMENTS

GB  2 391 840  2/2004

* cited by examiner

*Primary Examiner*—Toan To
(74) *Attorney, Agent, or Firm*—Manabu Kanesaka

(57) ABSTRACT

A knee-bag to be inflated in front of legs of an occupant includes a first member facing the occupant, a second member facing a side opposite to the occupant, and a tether provided in the knee-bag for connecting the first member and the second member. The tether extends in a lateral direction and has a middle portion and end portions in a thickness direction of the knee-bag. The middle portion has a width in the lateral direction smaller than that of the end portions, so that air-flow spaces are formed between a left end of the tether and a left side of the airbag and between a right end of the tether and a right side of the airbag.

12 Claims, 2 Drawing Sheets

KNEE-BAG AND OCCUPANT LEG PROTECTION APPARATUS

BACKGROUND OF THE INVENTION AND RELATED ART STATEMENT

The present invention relates to a knee-bag and an occupant leg protection apparatus including the knee-bag. The knee-bag restrains legs and a lower body of an occupant for protecting the knees against an impact on an instrument panel in front of a seat in case of an automobile crash.

An occupant leg protection apparatus prevents occupant legs from hitting against an instrument panel in front of a seat and receiving a heavy load in case of a frontal crash of a high-speed moving body such as an automobile. Such an occupant leg protection apparatus includes a knee-bag to be inflated in front of the occupant leg and an inflator (gas generator) for inflating the knee-bag.

Japanese Patent Publication (Kokai) No. 2003-182504 discloses an occupant leg protection apparatus with a knee-bag including a tether connecting a cloth on an occupant side and a cloth on an instrument panel side of the knee-bag. In the occupant leg protection apparatus, the tether restricts a thickness of the inflated knee-bag. In order to evenly restrain both legs of the occupant, it is preferable that the thickness of the knee-bag become substantially uniform in a lateral direction (from one side to the other side of the knee-bag in the lateral direction) when the knee-bag is inflated.

In order to make the thickness of the inflated knee-bag substantially uniform in the lateral direction, the tether may have a large width in the lateral direction and extend continuously in the lateral direction (extending from one side to the other side of the knee-bag in the lateral direction). When the tether has a large width in the lateral direction, the knee-bag has a small air-flow space therein, thereby reducing an inflation rate of the knee-bag. When the tether has a large width in the lateral direction, an opening may be provided in the middle of the tether in the lateral direction to form an air-flow space. However, it takes time and cost to provide such an opening.

In view of the problems described above, an object of the present invention is to provide a knee-bag having a uniform thickness in a lateral direction when inflated and capable of being inflated rapidly, and an occupant leg protection apparatus including the knee-bag.

Further objects and the advantages of the invention will be apparent from the following description of the invention.

SUMMARY OF THE INVENTION

In order to attain the objects described above, according to a first aspect of the present invention, a knee-bag to be inflated in front of occupant legs includes a first cloth facing an occupant; a second cloth facing a side opposite to the occupant; and a tether provided therein for connecting the first cloth and the second cloth. The tether extends continuously in a lateral direction, and air-flow spaces are formed between left and right ends of the tether and left and right sides of the airbag, respectively. The tether has a first width in the lateral direction at the middle in a thickness direction of the airbag, and a second width in the lateral direction at ends in the thickness direction of the airbag. The first width is smaller than the second width.

According to a second aspect of the present invention, an occupant leg protection apparatus includes the knee-bag of the first aspect of the present invention and an inflator for inflating the airbag. In the present invention, the tether extends continuously in the lateral direction, and a lateral width (maximum width) of the tether is 55 to 80% of a lateral width of the knee-bag (at a position where the tether is fixed).

In the knee-bag and the occupant leg protection apparatus of the present invention, when the knee-bag is inflated with gas from the inflator, gas flows in the knee-bag through the air-flow spaces to inflate the airbag. The spaces are formed between the left end of the tether and the left side of the airbag and between the right end of the tether and the right side of the airbag.

In the knee-bag of the present invention, since the tether extends continuously in the lateral direction, the thickness of the inflated knee-bag is substantially uniform in the lateral direction. In the thickness direction of the airbag, a middle portion of the tether has the width narrower than that at the ends of the tether. The ends of the tether are edges connected to the occupant-side cloth and the opposite-side cloth of the airbag. In other words, the middle of the tether is curved inwardly in the lateral direction.

In the knee-bag of the present invention, since the lateral edges of the tether are curved inwardly toward the center in the lateral direction, a cross-sectional area of each air-flow space becomes large. Through the air-flow spaces, gas can flow in the airbag with a sufficient volume and flow rate, thereby inflating the knee-bag rapidly.

DETAILED DESCRIPTION OF PREFERRED EMBODIMENTS

Figure 1:
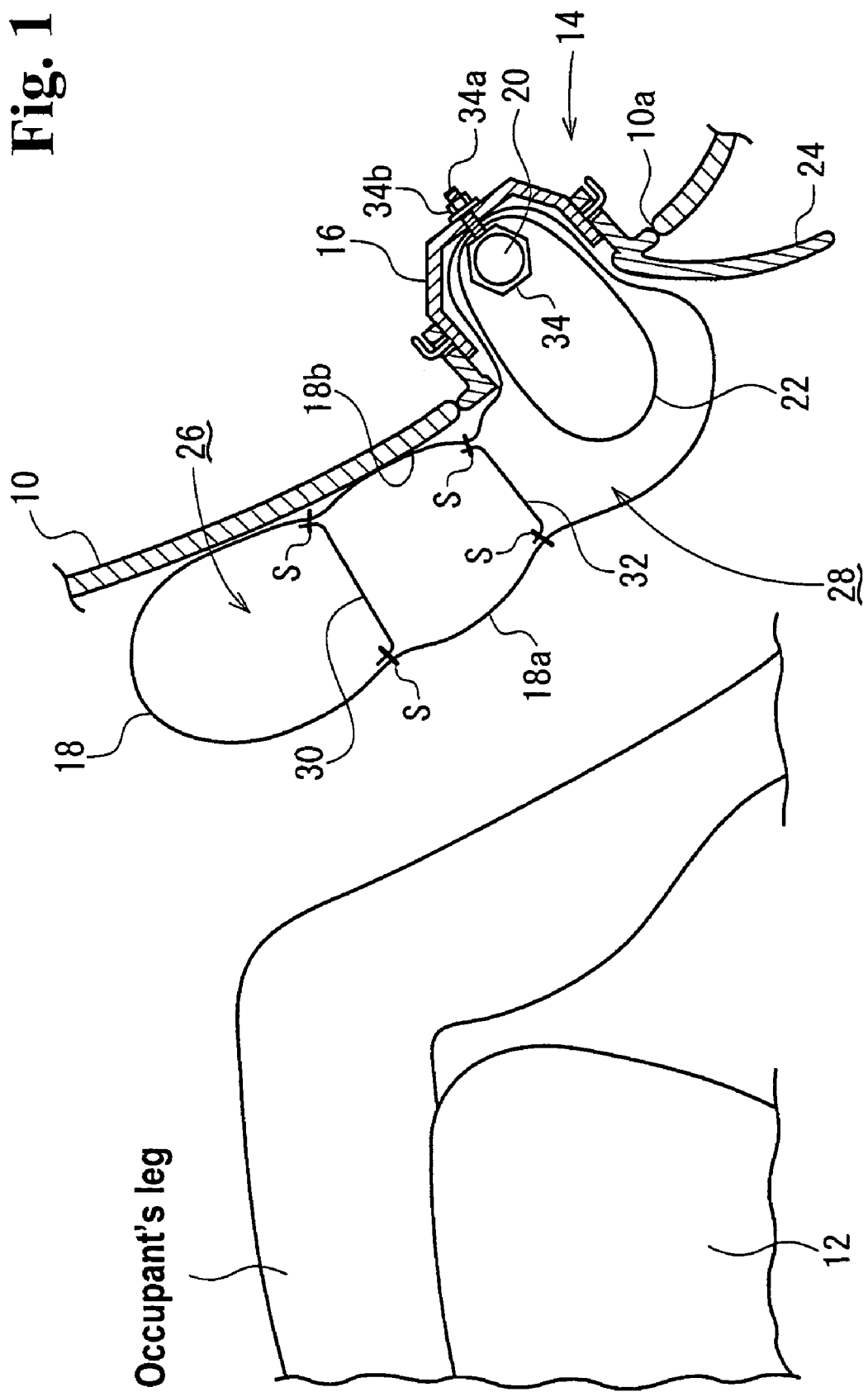
FIG. 1 is a sectional view of a seat and the vicinity thereof in a vehicle showing an inflated knee-bag according to an embodiment of the present invention.
Figure 2A:
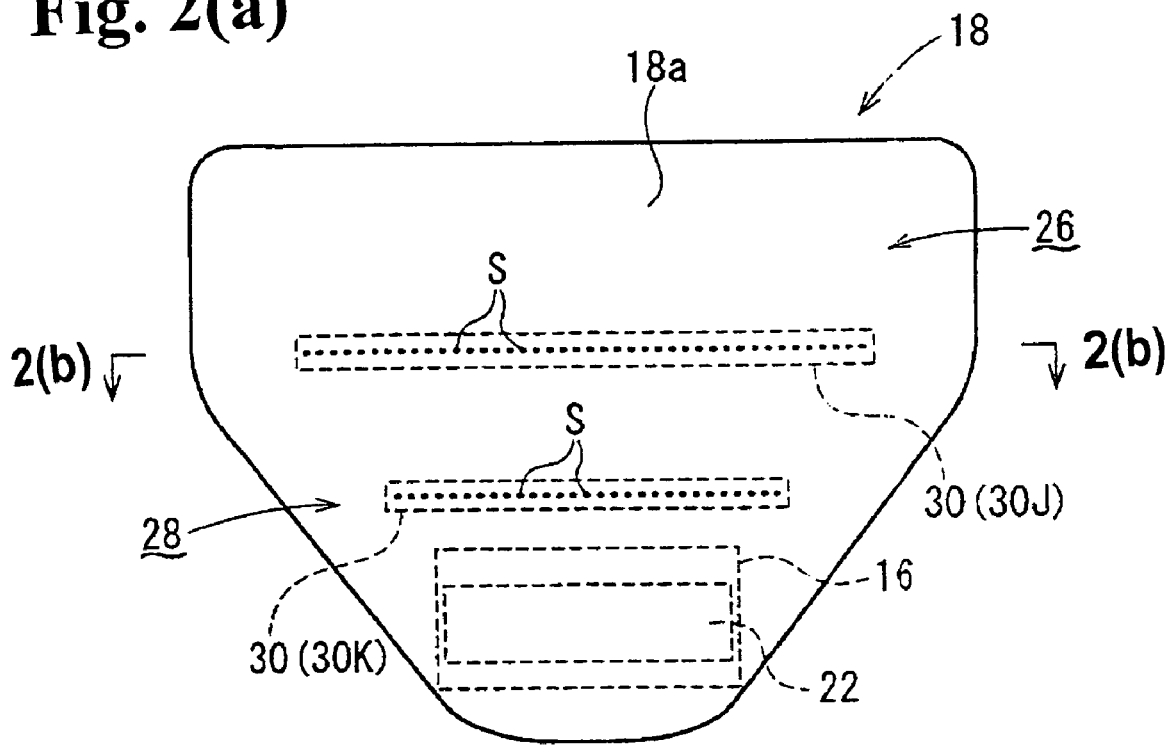
FIG. 2(a) is a front view of the inflated knee-bag in FIG. 1.
Figure 2B:
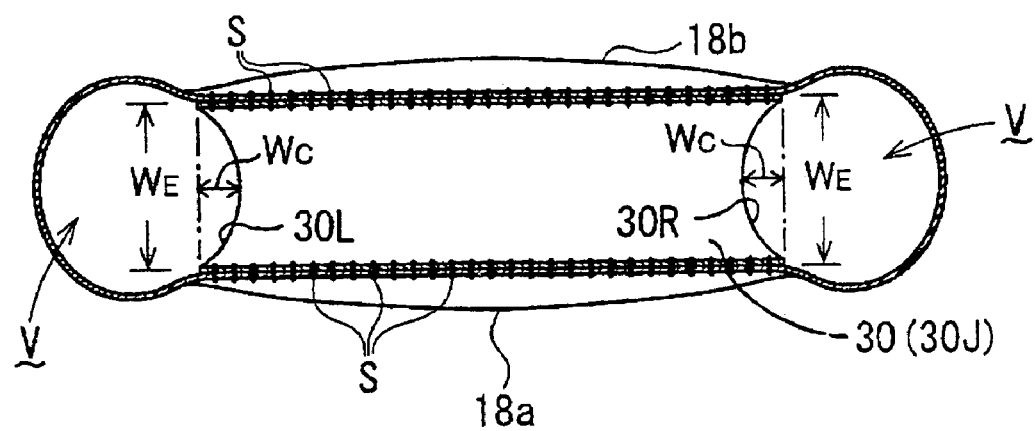
FIG. 2(b) is a sectional view taken along line 2(b)-2(b) in FIG. 2(a).

Hereunder, embodiments of the present invention will be described with reference to the accompanying drawings. FIG. 1 is a sectional view of a seat and the vicinity thereof in a vehicle showing an inflated knee-bag according to an embodiment. FIG. 2(a) is a front view of the inflated knee-bag. FIG. 2(b) is a sectional view taken along line 2(b)-2(b) in FIG. 2(a). In the following description, a lateral direction indicates a width direction of the vehicle.

An occupant leg protection apparatus 14 is installed in an instrument panel 10 in front of a seat 12. The occupant leg protection apparatus 14 includes a retainer 16 with an open front surface (occupant side); a knee-bag 18 fixed inside the retainer 16; an inflator (gas generator) 20 for inflating the knee-bag 18; and a diffuser 22 disposed in the knee-bag 18 for guiding gas in the knee-bag 18 from the inflator 20 in the lateral direction.

The retainer 16 is disposed in an opening 10a provided in the instrument panel 10. Usually, the knee-bag 18 and the diffuser 22 are folded and retained in the retainer 16. A lid 24 is provided on the front surface of the retainer 16 so as to cover the folded knee-bag 18. Usually, the lid 24 is disposed so as to be substantially flush with the instrument panel 10. When the knee-bag 18 is inflated, the lid 24 opens around a lower end thereof toward a front side of the instrument panel 10 as shown in FIG. 1.

As shown in FIG. 1, the opening 10a is provided at a position below a top of the seat 12. The knee-bag 18 is inflated upwardly from the opening 10a along the front surface (the occupant side) of the instrument panel 10.

As shown in FIG. 2(a), the knee-bag 18 includes a uniform width portion 26 and a narrow portion 28. The uniform width portion 26 is situated an upper portion of the airbag 18 and has a substantially uniform lateral width with a predetermined vertical length. The narrow portion 28 is situated at a lower portion of the airbag 18 and becomes narrower toward a bottom. A lower end of the narrow portion 28 is connected to the retainer 16.

The uniform width portion 26 is disposed so as to be above the top of the seat 12 when the knee-bag 18 is inflated from the opening 10a upwardly along the front surface of the instrument panel 10. Therefore, when the knee-bag 18 is inflated in front of knees of an occupant, the uniform width portion 26 faces the knees of the occupant sitting in the seat 12.

The uniform width portion 26 preferably has a lateral width of 500 to 600 mm. The lateral width of the front opening of the retainer 16 is preferably smaller than or equal to a half of the width of the uniform width portion 26, more preferably 40 to 50% thereof. As shown in FIG. 2(a), left and right sides of the narrow portion 28 preferably connect lower ends of the left and right sides of the uniform width portion 26 and left and right lower corners of the front opening of the retainer 16, respectively.

Inside the knee-bag 18, a plurality of tethers 30 (two tethers 30J and 30K in the embodiment) are provided. The tethers 30 connect a front side (occupant-side cloth) 18a and a rear side (instrument-panel-side cloth) 18b of the knee-bag 18. Symbol S denotes seams connecting the tethers 30 (30K and 30J) to the front side 18a and the rear side 18b. The upper tether 30J is disposed at a boundary between the uniform width portion 26 and the narrow portion 28 or slightly above the boundary (preferably 0 to 70 mm higher than the boundary between the uniform width portion 26 and the narrow portion 28). The lower tether 30K is disposed in the middle of the narrow portion 28 in the vertical direction.

The tethers 30 (30J and 30K) extend continuously in the lateral direction. Each tether is connected to the front side 18a and the rear side 18b across a predetermined lateral width. As shown in FIG. 2(b), the left and right ends of each tether 30 (only the tether 30J is shown in FIG. 2(b)) are separated from the left and right sides of the knee-bag 18, respectively. Between the left end of each tether 30 and the left side of the airbag 18 and between the right end of each tether 30 and the right side of the airbag 18, air-flow spaces V are formed.

As shown in FIG. 2(b), in the thickness direction of the airbag 18, a middle portion of each tether 30 is narrower than the ends of each tether 30. The ends of each tether 30 are edges stitched to the front side 18a and the rear side 18b of the airbag. In the embodiment, the left edge 30L and the right edge 30R of each tether 30 are curved inwardly.

As shown in FIG. 2(b), WC is a distance from a line segment between ends of the left edge 30L and the middle of the left edge 30L or a distance from a line segment between ends of the right edge 30R and the middle of the right edge 30R (the distance by which the left edge 30L or the right edge 30R is curved inwardly). WE is a width of the left edge 30L or the right edge 30R in the thickness direction of the knee-bag 18. In the present invention, WC is preferably 5 to 50% of WE.

A cross-sectional area of each air-flow space V surrounded by the left edge 30L or the right edge 30R of each tether 30 and the left or right side of the knee-bag 18 is preferably 3000 to 7850 $mm^2$, more preferably 4500 to 5500 $mm^2$. In this case, when the knee-bag 18 is folded in flat, a distance (shortest distance) from the left edge 30L or the right edge 30R of each tether 30 to the left or right side of the knee-bag 18 is preferably 80 to 130 mm, more preferably 90 to 120 mm.

In this embodiment, the line segment connecting the left ends of the upper and lower tethers 30J and 30K is preferably parallel to the left side of the narrow portion 28, and the line segment connecting the right ends of the upper and lower tethers 30J and 30K is preferably parallel to the right side of the narrow portion 28. In addition, the distance between each line segment and the corresponding side of the narrow section 28 is preferably 80 to 130 mm, and more preferably 90 to 120 mm. With such a structure, gas from the inflator 20 flows rapidly upwardly through the air-flow spaces V along the sides of the narrow portion 28.

The diffuser 22 is provided in the narrow portion 28. The inflator 20 is disposed in the diffuser 22. In this embodiment, the diffuser 22 has a tubular shape and is made by stitching a heat-resistant flexible cloth or formed of a synthetic-resin. The diffuser 22 is disposed so that ends thereof open in the lateral direction. Therefore, when the inflator 20 discharges gas in the diffuser 22, gas from the inflator 20 is guided only in the lateral direction through the opening ends of the diffuser 22.

In this embodiment, the diffuser 22 has a size capable of projecting forward (toward the occupant) from the front surface of the instrument panel 10 as shown in FIG. 1 with a pressure of gas discharged from the inflator 20 in the diffuser 22. A size of the diffuser 22 is preferably set so that the diffuser 22 projects from the front surface of the instrument panel 10 by 60 to 100 mm, or so that an area of the opening ends of the diffuser 22 projecting from the front surface of the instrument panel 10 is 3000 to 7850 $mm^2$.

In this embodiment, the inflator 20 is formed in a rod shape, and disposed in the diffuser 22 so that a longitudinal direction thereof is aligned laterally. The inflator 20 includes gas-discharging ports (not shown) in a circumferential surface thereof. The inflator 20 is held by an inflator holder 34. The inflator holder 34 includes a base portion and a band portion fixing the inflator 20 to the base portion (both of the portions have no reference numeral). A stud bolt 34a is projecting from the base portion. The stud bolt 34a passes through bolt holes (no reference numeral) provided in a rear side (opposite to the occupant) of the diffuser 22 and the rear side 18b of the lower end of the narrow portion 28. The stud bolt 34a projects from a backside (opposite to the occupant) of the airbag 18, and passes through a bolt hole (no reference numeral) provided in the retainer 16. With the stud bolt 34a and a nut 34b, the inflator holder 34 is fixed in the retainer 16, and the rear side of the diffuser 22 and the rear side 18b of the lower end of the narrow portion 28 are held between the inflator holder 34 and the retainer 16.

In case of a frontal crash of a vehicle provided with the occupant leg protection apparatus 14 having the above structure, the inflator 20 discharges gas. Gas from the inflator 20 starts inflating the knee-bag 18. The knee-bag 18 pushes so as to open the lid 24, and is inflated in front of the instrument panel 10 upwardly along the instrument panel 10. The uniform width portion 26 at the upper portion of the inflated knee-bag 18 faces and protects the knees of the occupant.

In this embodiment, the narrow portion 28 of the knee-bag 18 becomes narrower toward the bottom, in other words, becomes wider upwardly. Gas from the inflator 20 disposed in the lower end of the narrow portion 28 flows upwardly through the air-flow spaces V formed between the left end of each tether 30, (30J, 30K) and the left side of the narrow portion 28 and between the right end of each tether 30 (30J, 30K) and the right side of the narrow portion 28. Therefore, when the knee-bag 18 is inflated, first, the narrow portion 28 is inflated upwardly and laterally. Then, the uniform width portion 26 is inflated so as to bridge the inflated parts of the narrow portion 28 on both sides, and the middle of the knee-bag 18 is inflated.

In the knee-bag 18, since the left edge 30L and the right edge 30R of each tether 30 are curved inwardly, the cross-sectional area of each air-flow space V becomes large. In the embodiment, the cross-sectional area of each of the air-flow spaces V formed between the left edge 30L of each tether 30 and the left side of the airbag 18 and between the right edge 30R of each tether 30 and the right side of the airbag 18 is preferably 3000 to 7850 mm$^2$, more preferably 4500 to 5500 mm$^2$. Therefore, gas can flow in the knee-bag 18 through the air-flow spaces V with a sufficient volume and flow rate. As a result, the knee-bag 18 is inflated sufficiently rapidly.

In the knee-bag 18, since each tether 30 extends laterally and continuously, the thickness of the inflated knee-bag 18 is substantially uniform in the lateral direction. Therefore, the knees of the occupant can be protected substantially uniformly by the inflated knee-bag 18.

In this embodiment, the upper tether 30J is located on the boundary between the uniform width portion 26 and the narrow portion 28 or above the boundary, and the tether 30J has a large lateral width. Therefore, the capacity of the uniform width portion 26 is comparatively small, and the uniform width portion 26 is inflated rapidly. Since both sides and the uniform width portion 26 of the knee-bag 18 are inflated rapidly, the knee-bag 18 is inflated rapidly laterally and upwardly.

In this embodiment, since the diffuser 22 guides gas from the inflator 20 in the lateral direction, the lateral inflation of the knee-bag 18 is more rapid. In addition, when the knee-bag 18 is inflated, the diffuser 22 in the knee-bag 18 projects forward from the front surface of the instrument panel 10 by 60 to 100 mm due to the pressure of gas discharged from the inflator 20. Therefore, gas from the inflator 20 flows through the opening ends of the diffuser 22 in the lateral direction without hitting the inner wall of the knee-bag 18 and changing direction. As a result, gas from the inflator 20 can be guided efficiently in the lateral direction.

The embodiment is just an example of the present invention, and the present invention is not limited to the embodiment.

The disclosure of Japanese Patent Application No. 2004-054306, filed on Feb. 27, 2004, is incorporated in the application.

While the invention has been explained with reference to the specific embodiments of the invention, the explanation is illustrative and the invention is limited only by the appended claims.

What is claimed is:

1. A knee-bag to be inflated in front of an occupant leg, comprising:
   a first member facing the occupant,
   a second member facing the first member, and
   a tether provided in the knee-bag for connecting the first member and the second member, said tether extending in a lateral direction and having end portions in a thickness direction of the knee-bag, a middle portion between the end portions in the thickness direction, and lateral ends in the lateral direction, said middle portion having a width between the lateral ends in the lateral direction less than each of widths between the lateral ends at the end portions so that airflow spaces are formed between a left end of the tether and a left side of the knee-bag and between a right end of the tether and a right side of the knee-bag,
   wherein each of said lateral ends of the tether is dented at the middle portion inwardly in the lateral direction.

2. An occupant leg protection apparatus comprising the knee-bag according to claim 1 and an inflator for inflating the airbag.

3. A knee-bag according to claim 1, further comprising a second tether disposed adjacent to said tether with a space therebetween and having a middle and end portions substantially same as those of said tether.

4. A knee-bag according to claim 3, further comprising a uniform width portion, and a narrow portion extending downwardly from the uniform width portion to have a width gradually decreased, said tether being located at a portion between the uniform width portion and the narrow portion.

5. A knee-bag according to claim 4, wherein said second member includes an opening for an inflator at a lower portion of the narrow portion, said second tether being located between the opening and said tether.

6. A knee-bag according to claim 5, further comprising a diffuser situated inside the narrow portion for covering the opening.

7. A knee-bag to be inflated in front of an occupant leg, comprising:
   a first member facing the occupant,
   a second member facing the first member, and
   a tether provided in the knee-bag for connecting the first member and the second member, said tether extending in a lateral direction and having a middle portion and end portions in a thickness direction of the knee-bag, said middle portion having a width in the lateral direction less than those of the end portions so that air-flow spaces are formed between a left end of the tether and a left side of the knee-bag and between a right end of the tether and a right side of the knee-bag,
   wherein said tether includes lateral ends, each lateral end forming an inwardly curved portion to form one air-flow space in a generally circular shape.

8. A knee-bag according to claim 7, further comprising a second tether disposed adjacent to said tether with a space therebetween and having a middle and end portions substantially same as those of said tether.

9. A knee-bag according to claim 8, further comprising a uniform width portion, and a narrow portion extending downwardly from the uniform width portion to have a width gradually decreased, said tether being located at a portion between the uniform width portion and the narrow portion.

10. A knee-bag according to claim 9, wherein said second member includes an opening for an inflator at a lower portion of the narrow portion, said second tether being located between the opening and said tether.

11. A knee-bag according to claim 10, further comprising a diffuser situated inside the narrow portion for covering the opening.

12. An occupant leg protection apparatus comprising the knee-bag according to claim 7 and an inflator for inflating the airbag.

* * * * *